United States Patent [19]

Fava

[11] 4,129,615

[45] Dec. 12, 1978

[54] PLASTIC ALLOY OF COPOLYMERS

[75] Inventor: Ronald A. Fava, Monroeville, Pa.

[73] Assignee: ARCO Polymers, Inc., Philadelphia, Pa.

[21] Appl. No.: 863,963

[22] Filed: Dec. 23, 1977

[51] Int. Cl.² ............... C08L 33/12; C08L 35/06; C08L 53/02

[52] U.S. Cl. .............. 260/876 B; 260/880 B; 260/880 R; 260/901; 526/52.2

[58] Field of Search ............... 260/901, 876 B; 526/52.2

[56] References Cited

U.S. PATENT DOCUMENTS

| | | | |
|---|---|---|---|
| 3,432,479 | 3/1969 | Verdol et al. | 526/52.2 |
| 3,676,404 | 7/1972 | Nield | 260/78 U A |
| 3,883,617 | 5/1975 | Krieg et al. | 260/883 |
| 3,998,907 | 12/1976 | DiGiulio | 260/857 L |

Primary Examiner—Carman J. Seccuro
Attorney, Agent, or Firm—John R. Ewbank; Lewis J. Young

[57] ABSTRACT

Thermoplastic molding composition consists essentially of a blend of:
 A. 20–80% by weight of a copolymer comprising methyl methacrylate and styrene containing from 20% to 80% of methyl methacrylate and from 20% to 80% of styrene; and
 B. from about 20% to about 80% by weight of a copolymer comprising:
  (aa) an amine nitrogen derivative of an ethylenically unsaturated dicarboxylic acid constituting from 5% to 35% of the copolymer of B; and
  (bb) vinyl aromatic composition constituting from 60% to 95% of the copolymer of B;
 each of A and B having as an optional component of said copolymer
  (cc) a rubbery block polymer prepared in a stereospecific system using from 5 to 35% vinyl aromatic compound and from 65 to 95% conjugated alkadiene, said rubbery block copolymer constituting from 5% to 35% of its copolymer.

2 Claims, No Drawings

PLASTIC ALLOY OF COPOLYMERS

RELATED INVENTIONS

Reference is made to the applications of Ronald A. Fava, Ser. No. 863,964, filed Dec. 23, 1978 concerning "Moldable Blend of Polymethyl Methacrylate and Styrene-Maleimide" and Ser. No. 863,962, filed Dec. 23, 1978 for "Thermoplastic Molding Composition of Polymethyl Methacrylate and Rubber Modified Styrene-maleimide," all the disclosure of each of which is deemed here reiterated and incorporated herein.

BACKGROUND OF INVENTION

This invention relates to the blending of thermoplastic compositions having characteristics which are desireable but which have heretofor not been readily obtainable at a competitive cost.

Many organic liquids having a moderately low molecular weight are soluble in each other. When the molecular weight of an organic material is sufficiently great (macromolecular) to provide structural strength as a solid, such solid is generally not soluble in other macromolecular structural materials, (i.e. plastics). The compatibility and mutual solubility of organic plastics are generally not observed. Most attempts to mix pellets of different molding compositions at the time when the pellets are fed to an extruder result in extrudates having low strength by reason of the fracture lines at the boundaries amongst the different compositions. The discovery of a compatible blend of plastics, sometime referred to as plastic "alloys" is a significant and unexpected discovery by reason of the incompatibility of most of the conceivable permutations of mixtures of plastics.

Belgian Pat. No. 767,255 describes blends of polymethyl methacrylate and copolymers of styrene and maleic anhydride. DiGiulio U.S. Pat. No. 3,998,907 describes a method of preparing maleimide-containing copolymers by reacting amine or ammonia with particles of the copolymer comprising maleic anhydride under autogenous pressure at 125° to 200° C. Heretofor, copolymers of styrene and methyl methacrylate have been prepared, but such compositions have not had the combination of appropriate viscosity and softening temperatures desired in some operations.

Notwithstanding the persistent effort to prepare appropriate blends, there has been a failure by others to meet the demands for a blend having an attractive combination of adequate fluidity at molding temperatures, adequate stiffness in the molded product, and adequately high softening point.

SUMMARY OF THE INVENTION

In accordance with the present invention, a thermoplastic molding composition is prepared by blending: a copolymer comprising styrene and methyl methacrylate with a copolymer comprising
 (aa) an amine nitrogen derivative of an ethylenically unsaturated dicarboxylic acid constituting from 5% to 35% of the copolymer, and
 (bb) vinyl aromatic composition constituting from 60% to 95% of the copolymer, each of said copolymers having as an optional component
 (cc) a rubbery block polymer prepared in a stereospecific system using from 5 to 35% vinyl aromatic compound and from 65 to 95% conjugated alkadiene, said rubbery block copolymer constituting from 5% to 35% of its copolymer.

The invention is further clarified by reference to a plurality of examples.

EXAMPLES 1–4

An extruder was employed for thoroughly mixing pellets of a copolymer of methyl methacrylate and styrene and an equal weight of pellets of a copolymer of styrene and maleimide. The method of Example 1 of DiGiulio U.S. Pat. No. 3,998,907, using aqueous ammonia at a temperature of about 147° C. for about 12 hours at a pressure of about 5 atmospheres was employed to imidize a precursor which was a copolymer of styrene and about 8% maleicanhydride, so that the imidized copolymer contained 8% maleimide.

A series of compositions was prepared in which the percentage of methyl methacrylate in the copolymer was varied, while using equal weights of the two types of pellets. The extrudate was shaped into testing samples.

The usefulness of some copolymers of styrene and methyl methacrylate has been somewhat restricted because softening points were sufficiently low to be troublesome in some of the intended uses for molded plastic products. Such softening temperature can be increased by the inclusion of maleimide in the alloy.

The data shown in Table 1 show some of the properties measured for 4 blends of these components. A blend consisting of 50% polymethyl methacrylate and 50% copolymer of styrene and maleimide can be identified equivalently as Control A, or as Example A.

TABLE I

| Example | % MMA in S-MMA | Flexural Modulus (10³PSI) | Flexural Strength (PSI) | Vicat Temperature (° F) |
|---|---|---|---|---|
| 1 | 25 | 470 | 6,600 | 243 |
| 2 | 47 | 467 | 9,000 | 240 |
| 3 | 61 | 469 | 8,400 | 243 |
| 4 | 75 | 456 | 8,200 | 248 |
| A | 100 | 454 | 10,400 | 254 |

EXAMPLES 5–8

High impact strength is sometimes imparted to molded plastics by including a controlled amount of rubber in the copolymer. It is generally difficult to blend rubber-modified copolymers. Surprisingly, the rubber-modified copolymers corresponding to those of the type of Examples 1–4 are compatible with each other and can be alloyed into thermoplastic molding compositions having advantageous properties. A terpolymer of butadiene, styrene and maleimide was prepared by first preparing an organic solution of a block rubbery copolymer derived from the polymerization of 85% butadiene and 15% styrene using butyl lithium as a catalyst. Styrene and maleic anhydride are added to such solution of the block copolymer of 85% butadiene and 15% styrene and subjected to copolymerization so that the terpolymer contains about 13% butadiene, about 7% maleic anhydride and about 80% styrene. A rubbery block copolymer marketed by Firestone as Stereon 720 is suitable as said block rubbery copolymer, and can be dissolved in xylene to provide a solution. The method of Example 1 of DiGiulio U.S. Pat. No. 3,998,907, using aqueous ammonia at about 147° C. at a pressure of about 5 atmospheres for about 12 hours was employed to produce a terpolymer containing 7% maleimide.

A copolymer featuring more methyl methacrylate than styrene was modified by a rubbery block polymer in preparing a terpolymer. Butadiene was copolymerized with styrene using butyl lithium as a catalyst in a xylene solvent to provide a solution of a block rubbery copolymer containing 85% butadiene and 15% styrene. If desired a solution of Stereon 720, marketed by Firestone, can be utilized as the solution of rubbery block polymer. Methyl methacrylate and styrene were added to the solution and copolymerized to provide a terpolymer containing 57% methylmethacrylate, 37% styrene and 6% butadiene. This terpolymer can be molded to provide transparent products.

A series of blends were prepared from mixtures of the two types of rubber-modified terpolymers, each comprising styrene and butadiene, but differing that one contains 57% methyl methacrylate and the other 6% maleimide. As shown in Table II, the softening temperature, as measured by Vicat temperature is increased from 219° F. to 232° F. by the blending of 20% of the terpolymer containing maleimide. The flexural modulus for the product containing 20% of the methacrylate type copolymer was 307,000 psi. The advantageous combination of properties indicates usefulness for the thermoplastic compositions resulting from this unique plastic alloy.

EXAMPLE 9

Various types of copolymers of styrene and methyl methacrylate molding compositions having different particle sizes, different molecular weights, etc. are employed in experimental blends while obtaining the advantageous results described in connection with Examples 1–8. Experimental blends are prepared using copolymers comprising maleimide and styrene but varying the amount of maleimide. Thus it is established that copolymers containing concentrations of amino derivatives of ethylenically unsaturated dicarboxylicacids within the range from 5% to 35% are suitable for use in the blends of the present invention.

EXAMPLE 10

By a series of tests, it is established that the amides and imides of maleic acid, fumaric acid, itaconic acid, citraconic acid, mesaconic acid, ethyl maleic acid, methyl itaconic acid, chloromaleic acid, dichloromaleic acid, bromomaleic acid, and dibromomaleic acid are suitable as the amino nitrogen derivative of the ethylenically unsaturated dicarboxylic acid in the blends of the present invention. In preparing the nitrogen derivatives, methyl amine, ammonia, ethyl amine, propyl amine, and/or isopropyl amine may be utilized. The ammoniacal reactant corresponds to the formula $RNH_2$ in which R is hydrogen or an alkyl group of not more than 3 carbon atoms. It is appropriate to prepare the nitrogen derivative of the acid prior to the copolymerization, or if desired, the nitrogen-containing copolymer can be prepared from a precursor such as a copolymer derived from styrene and the ethylenically unsaturated dicarboxylic acid or its oxygen-containing derivative such as the anhydride. Such precursor copolymer can be subjected to the $RNH_2$ type compound at an elevated pressure and temperature to prepare the nitrogen derivative of the copolymer comprising the ethylenically unsaturated dicarboxylic acid moiety. The precursor copolymer containing a maleic anhydride type of acid component is converted in the presence of a basic nitrogen system at a temperature of from about 125° to 200° C. at an autogenous pressure for 0.5 to 48 hours and thereafter depressurizing and devolatilizing the product.

TABLE II

| Example | % R-MI-S | % R-MMA-S In Blend | Izod Impact (ft-lb/in) | Flexural Modulus ($10^3$ PSI) | Vicat Temperature (° F) |
| --- | --- | --- | --- | --- | --- |
| B | 100 | 0 | 1.40 | 296 | 260 |
| 5 | 80 | 20 | 1.03 | 307 | 255 |
| 6 | 60 | 40 | 1.15 | 281 | 248 |
| 7 | 40 | 60 | 1.28 | 273 | 239 |
| 8 | 20 | 80 | 1.39 | 279 | 232 |
| C | 0 | 100 | 1.57 | 260 | 219 |

EXAMPLE 11

Blends of copolymers of methyl methacrylate-styrene and copolymers of styrene-maleimide containing about 16% maleimide are prepared by preparing solutions of each of the two plastics in a halogenated organic solvent such as tetrachloroethylene, mixing the two solutions, volatilizing the tetrachloroethylene under vacuum, and extruding the thus precipitated mixture. The characteristics of the samples closely resemble those of products prepared by blending in an extruder. A basis is thus established for the conclusion that the advantageous results shown in Table I are attributable to the advantageous alloying propensities of the components and not primarily to the method of blending.

EXAMPLE 12

Blends of copolymers comprising styrene and methyl methacrylate and copolymers comprising styrene and maleimide are prepared throughout the 20 to 80% and 80 to 20% ranges, using a series of rubber-modified styrene-maleimide copolymers. It is thus established the attainment of advantageous results is not jeopardized by conventional variations in the method of preparing the maleimide, the use of ammonia, the use or choice of $C_1$-$C_3$ primary amine, or mixtures thereof, and similar modifications. The minimum amount of maleimide in the copolymer must be at least 5%, and lesser amounts fail to impart to the blends the desirable properties which characterize the blends of the present invention. The maximum amount of type maleimide component in the copolymer must not be greater than 35% because the extrudability of the hot mix is impaired by excessive concentrations of the nitrogen derivative of ethylenically unsaturated dicarboxylic acid. Some association of the imide or amide group of the copolymer chain and the ester group of the methyl methacrylate chain is indicated as a synergistic advantage of the unique alloys of the present invention. If a rubbery block copolymer is employed, it should be present in a concentration within the range from 5 to 35% in each of the copolymers.

The block copolymers desirably are those having a major portion of blocks or conjugated diene having an average molecular weight greater than the average molecular weight of the blocks of vinyl aromatic compounds. The vinyl aromatic component generally constitutes from about 5% to about 35% of the block copolymer. Although styrene is the cheapest and most available vinyl aromatic compound, the prior literature indicates that useful products can be made from compounds in which methoxy, methyl, halo, trihalomethyl, and related substituents are attached to the vinyl aromatic compound such as vinyl naphthalene. The diene content desirably is from about 65 to 95%. The conjugated diene may be butadiene, isoprene, chloroprene and piperylene. Block polymers can be prepared using a solvent such as hexane for both the vinyl aromatic monomer and the diene, using 2-lithium butyl as the catalyst. Among the suitable block copolymers is Stereon 720, marketed by Firestone, and containing about 90% butadiene and about 10% styrene.

The block copolymer rubber can be dissolved in a monomeric vinyl aromatic composition such as styrene, initiating polymerization, and adding the ethylenically unsaturated dicarboxylic acid derivative incrementally during polymerization. U.S. Pat. 3,998,907 describes a method of preparing a terpolymer of rubber-modified styrene-maleic anhydride terpolymer.

Various modifications of the invention are possible without departing from the scope of the invention as set forth in the claims.

The invention claimed is:

1. Thermoplastic molding composition consists essentially of a blend of:
   A. 20–80% by weight of a copolymer comprising methyl methacrylate and vinyl aromatic compound containing from 20% to 80% of methyl methacrylate and from 20% to 80% of vinyl aromatic compound; and
   B. from about 20% to about 80% by weight of a copolymer comprising:
      (aa) an imide derivative of an ethylenically unsaturated dicarboxylic acid constituting from 5% to 35% of the copolymer of B; and
      (bb) vinyl aromatic compound constituting from 60% to 95% of the copolymer of B.

2. The composition of claim 1 in which each of A and B is a copolymer having three components, the third component being:
      (cc) a rubbery block polymer prepared in a stereospecific system using from 5 to 35% vinyl aromatic compound and from 65 to 95% conjugated alkadiene, said rubber block copolymer constituting from 5% to 35% of its copolymer.

* * * * *